United States Patent
Monma

(10) Patent No.: US 10,577,496 B2
(45) Date of Patent: Mar. 3, 2020

(54) PROCESS FOR PRODUCING POLYACETAL RESIN COMPOSITION

(71) Applicant: Polyplastics Co., Ltd., Tokyo (JP)

(72) Inventor: Tomohiro Monma, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 36 days.

(21) Appl. No.: 15/777,082

(22) PCT Filed: Nov. 4, 2016

(86) PCT No.: PCT/JP2016/082824
§ 371 (c)(1),
(2) Date: May 17, 2018

(87) PCT Pub. No.: WO2017/104286
PCT Pub. Date: Jun. 22, 2017

(65) Prior Publication Data
US 2019/0241732 A1    Aug. 8, 2019

(30) Foreign Application Priority Data

Dec. 16, 2015   (JP) ................. 2015-245483

(51) Int. Cl.
| | | |
|---|---|---|
| C08L 59/04 | (2006.01) | |
| C08L 23/08 | (2006.01) | |
| C08K 5/092 | (2006.01) | |
| C08K 3/20 | (2006.01) | |
| C08K 3/26 | (2006.01) | |
| C08K 3/32 | (2006.01) | |
| C08K 5/098 | (2006.01) | |
| C08J 3/00 | (2006.01) | |
| C08K 5/13 | (2006.01) | |
| C08L 33/02 | (2006.01) | |

(52) U.S. Cl.
CPC ............ *C08L 59/04* (2013.01); *C08J 3/005* (2013.01); *C08K 3/20* (2013.01); *C08K 3/26* (2013.01); *C08K 3/32* (2013.01); *C08K 5/092* (2013.01); *C08K 5/098* (2013.01); *C08K 5/13* (2013.01); *C08L 23/08* (2013.01); *C08L 33/02* (2013.01); *C08J 2359/00* (2013.01); *C08J 2423/08* (2013.01); *C08J 2433/02* (2013.01)

(58) Field of Classification Search
CPC ........................................... C08L 59/04
USPC ............................................ 528/233
See application file for complete search history.

(56) References Cited

U.S. PATENT DOCUMENTS

| | | |
|---|---|---|
| 2016/0237221 A1 | 8/2016 | Monma et al. |
| 2016/0280852 A1 | 9/2016 | Masuda et al. |
| 2017/0073451 A1 | 3/2017 | Horiguchi et al. |

FOREIGN PATENT DOCUMENTS

| | | |
|---|---|---|
| EP | 2927254 A1 | 10/2015 |
| JP | H11-323076 A | 11/1999 |
| JP | 2000-017144 A | 1/2000 |
| JP | 2000-239484 A | 9/2000 |
| JP | 2004-149670 A | 5/2004 |
| JP | 2014-105278 A | 6/2014 |
| JP | 2014-105279 A | 6/2014 |
| JP | 2015-101599 A | 6/2015 |
| WO | WO 2015/075999 A1 | 5/2015 |
| WO | WO 2015/151342 A1 | 10/2015 |

OTHER PUBLICATIONS

Extended European Search Report issued in European Patent Application No. 16875271.5, dated Aug. 20, 2019.
Notification of Reasons for Refusal issued in Japanese Patent Application No. 2015-245483, dated Sep. 3, 2019.

*Primary Examiner* — Duc Truong
(74) *Attorney, Agent, or Firm* — Knobbe, Martens, Olson & Bear LLP

(57) ABSTRACT

A polyacetal resin composition. An aliphatic polycarboxylic acid having four or more carbons and two or more carboxyl groups and a hindered-phenol antioxidant are incorporated into a polyacetal copolymer obtained by copolymerizing trioxane as a major monomer with a cyclic ether and/or cyclic formal each having at least one carbon-carbon bond as a comonomer using a specific heteropoly acid as a polymerization catalyst, adding, to the resultant reaction product, a compound which is any of the carbonates, hydrogen carbonates, and carboxylates of alkali metal elements or alkaline-earth metal elements, the hydrates of these, and the hydroxides of alkali metal elements or alkaline-earth metal elements, and melt-kneading the mixture to deactivate the polymerization catalyst.

3 Claims, No Drawings

PROCESS FOR PRODUCING POLYACETAL RESIN COMPOSITION

RELATED APPLICATIONS

This application is the U.S. National Phase under 35 U.S.C. § 371 of International Application PCT/JP2016/082824, filed Nov. 4, 2016, designating the U.S., and published in Japanese as WO 2017/104286 on Jun. 22, 2017, which claims priority to Japanese Patent Application No. 2015-245483, filed Dec. 16, 2015, the entire contents of which are incorporated herein by reference.

TECHNICAL FIELD

The present invention relates to a method for producing a polyacetal resin composition.

BACKGROUND ART

A polyacetal resin (also referred to as polyoxymethylene resin abbreviated to POM resin) has well-balanced mechanical properties and is excellent in, for example, abrasion and wear resistance characteristics, chemical resistance, heat resistance, and electrical characteristics, and is therefore widely used in the fields of, for example, motor vehicles and electric and electronic products.

Incidentally, the required characteristics in such fields are gradually becoming sophisticated. In order to meet such requirements, a polyacetal resin composition containing a polyacetal resin and a carboxyl group-containing compound having a pKa of 3.6 or more has been proposed (for example, see Patent Document 1).

The carboxyl group-containing compound is not particularly limited as long as the pKa is 3.6 or more, and examples thereof include various compounds having free carboxyl groups, such as, aliphatic carboxylic acids, alicyclic carboxylic acids, and aromatic carboxylic acids. Aliphatic, alicyclic, and aromatic polycarboxylic acids can also be used in a form having at least one carboxyl group, such as in dicarboxylic acid monoesters (e.g., monoethyl maleate, monomethyl fumarate, and monoethyl fumarate), tricarboxylic acid mono- or diesters, and tetracarboxylic acid mono- di-, or triesters. Preferred carboxylic acids are aliphatic mono- or dicarboxylic acids and aromatic monocarboxylic acids.

The polyacetal resin composition may further include, for example, an antioxidant, an alkali or alkaline earth metal compound, and a stabilizer. Preferred examples of the antioxidant include phenolic antioxidants (particularly, hindered phenols).

It has been proposed that at least one selected from polyalkylene glycols, fatty acid esters, fatty acid amides, fatty acid metal salts, etc. can be used as a processing stabilizer. As the fatty acid metal salt, a salt of fatty acid having 10 or more carbons and a metal can be used. The metal is preferably mono- to tetra-valent (particularly, mono- or di-valent) metal. Usually, an alkaline earth metal (such as Mg or Ca) salt is preferably used. Examples of the fatty acid metal salt include magnesium stearate, calcium stearate, zinc stearate, and calcium 12-hydroxystearate.

The polyacetal resin composition described in Patent Document 1 has an effect of greatly improving the thermal stability of the polyacetal resin (particularly, melt stability during the molding process). The composition also can suppress the generation amount of formaldehyde to an extremely low level and shows an effect of greatly improving the working environment. Furthermore, the composition can suppress the generation of formaldehyde even under severe conditions and can prevent decomposed products from adhering to the mold (mold deposit), leaching of decomposed products from the molded product, and thermal deterioration of the molded product to show an effect of improving the quality of the molded product and formability.

In addition, it is known that addition of a fatty acid metal salt as a component of the polyacetal resin composition contributes to improvement in physical properties of the welded part of a polyacetal resin molded product (for example, see Patent Document 2). The raw material fatty acid of the fatty acid metal salt is preferably myristic acid, palmitic acid, or stearic acid. The metal compound as the raw material of the fatty acid metal salt is preferably a hydroxide, oxide, or chloride of calcium. Preferred examples of the fatty acid metal salt include calcium dimyristate, calcium dipalmitate, calcium distearate, calcium (myristate-palmitate), calcium (myristate-stearate), and calcium (palmitate-stearate). In particular, the fatty acid metal salt is preferably calcium dipalmitate or calcium distearate.

In production of a polyacetal copolymer using trioxane as a main monomer (a) and a cyclic ether and/or cyclic formal having at least one carbon-carbon bond as a comonomer (b), it is also proposed to perform copolymerization using heteropoly acid represented by Formula (1) as a polymerization catalyst (c) and deactivation of the polymerization catalyst (c) by adding a compound (d) which is a carbonate, hydrogen carbonate, or carboxylate of an alkali metal element or an alkaline earth metal element or a hydrate thereof to the reaction product and melt-kneading the mixture (see Patent Document 3).

$$H_m[M^1{}_x \cdot M^2{}_y O_z] \cdot nH_2O \qquad (1)$$

where, $M^1$ represents a central element composed of one or two elements selected from P and Si; $M^2$ represents one or more coordination elements selected from W, Mo, and V; and x represents an integer of 1 or more and 10 or less, y represents an integer of 6 or more and 40 or less, z represents an integer of 10 or more and 100 or less, m represents an integer of 1 or more, and n represents an integer of 0 or more and 50 or less.

It is also proposed to use a hydroxide or alkoxide compound of an alkali metal or an alkaline earth metal as a deactivating agent (d) of the polymerization catalyst (c) (see Patent Document 4).

According to the inventions of Patent Documents 3 and 4, not only a polymerization catalyst can be effectively deactivated but also unstable terminal portions can be stabilized by using a hydroxide or alkoxide compound of an alkali metal or an alkaline earth metal as a deactivating agent of the polymerization catalyst, and a high-quality polyacetal copolymer having excellent thermal stability and generating a very small amount of formaldehyde can be produced inexpensively through a simple manufacturing process.

In addition, compared to the conventional wet deactivation, the dry deactivation can rapidly and completely deactivate a polymerization catalyst and then stabilize unstable terminal portions through a very rationalized process in which a deactivation process is simplified and a washing process is omitted. As a result, a high-quality polyacetal copolymer that is thermally stable and has extremely small amounts of unstable terminal portions and formaldehyde emission can be produced inexpensively without problems, such as decomposition and degeneration, due to a catalyst.

Patent Document 1: Japanese Unexamined Patent Application, Publication No. 2000-239484
Patent Document 2: Japanese Unexamined Patent Application, Publication No. H11-323076
Patent Document 3: Japanese Unexamined Patent Application, Publication No. 2014-105278
Patent Document 4: Japanese Unexamined Patent Application, Publication No. 2014-105279

DISCLOSURE OF THE INVENTION

Problems to be Solved by the Invention

In recent years, a high-quality polyacetal copolymer, in particular, having excellent thermal stability and generating a very small amount of formaldehyde is required. In addition, it is known that the component constituting the polyacetal resin composition may affect the appearance of a molded article.

Even in the polyacetal resin compositions according to Patent Documents 1 to 3, there is a room for further improvement in suppression of the emission amount of formaldehyde and improvement in the appearance of the molded article are necessary.

It is an object of the present invention to provide a polyacetal resin composition that is more versatile in that the emission amount of formaldehyde is very small and that the molded article can have better appearance.

Means for Solving the Problems

The present inventor has intensively studied to achieve the above-mentioned object and as a result, has found that the object can be achieved by using a specific heteropoly acid as a catalyst and adding a specific carboxylic acid and a specific antioxidant to a polyacetal copolymer prepared by melt-kneading, for example, a carbonate of an alkali metal or an alkaline earth metal for deactivating the catalyst and treating unstable terminals, and the present invention has been accomplished. More specifically, the present invention provides the followings.

(1) The present invention relates to a method for producing a polyacetal resin composition by adding a compound (d) which is a carbonate, hydrogen carbonate, or carboxylate of an alkali metal element or an alkaline earth metal element or a hydrate thereof or a hydroxide of an alkali metal element or an alkaline earth metal element to a reaction product prepared by copolymerization of trioxane as a main monomer (a) and a cyclic ether and/or cyclic formal having at least one carbon-carbon bond as a comonomer (b) using a heteropoly acid represented by Formula (1) shown below as a polymerization catalyst (c); melt-kneading the mixture to deactivate the polymerization catalyst (c) and prepare a polyacetal copolymer; and adding 0.002 parts by weight or more and 0.1 parts by weight or less of an aliphatic polycarboxylic acid (e) having four or more carbons and two or more carboxyl groups and 0.01 parts by weight or more and 0.5 parts by weight or less of a hindered phenolic antioxidant (f) to 100 parts by weight of the polyacetal copolymer,

$$H_m[M^1{}_x \cdot M^2{}_y O_z] \cdot nH_2O \tag{1}$$

where, $M^1$ represents a central element composed of one or two selected from P and Si; $M^2$ represents one or more coordination elements selected from W, Mo, and V; and x represents an integer of 1 or more and 10 or less, y represents an integer of 6 or more and 40 or less, z represents an integer of 10 or more and 100 or less, m represents an integer of 1 or more, and n represents an integer of 0 or more and 50 or less.

(2) The present invention relates to the method for producing a polyacetal resin composition according to aspect (1), wherein the aliphatic polycarboxylic acid is one or more selected from adipic acid, decanedioic acid, and dodecanedioic acid.

(3) The present invention relates to the method for producing a polyacetal resin composition according to aspect (1), wherein the aliphatic polycarboxylic acid is an ethylene acrylic acid copolymer resin or an ethylene methacrylic acid copolymer resin.

Effects of the Invention

The present invention can achieve both the suppression of the generation amount of formaldehyde to a low level and the provision of better appearance of the molded article. Accordingly, the present invention can provide a polyacetal resin composition having higher versatility.

PREFERRED MODE FOR CARRYING OUT THE INVENTION

Specific embodiments of the present invention will now be described in detail, but the present invention is not limited to the following embodiments and can be implemented with appropriate modification within the scope of the purpose of the present invention.

<Method for Producing Polyacetal Copolymer>

In the present invention, a polyacetal copolymer is prepared by copolymerizing trioxane, which is a cyclic trimer of formaldehyde, as a main monomer (a) and a cyclic ether and/or cyclic formal having at least one carbon-carbon bond as a comonomer (b) using a predetermined heteropoly acid as a polymerization catalyst (c); and adding a predetermined salt (d) to the resulting reaction product and melt-kneading the mixture to deactivate the polymerization catalyst (c). In the present invention, a polycarboxylic acid (e) having four or more carbons and containing two or more carboxyl groups and a hindered phenolic antioxidant (f) are added to the polyacetal copolymer.

[Comonomer (b)]

As the comonomer, a compound (b) selected from cyclic ethers and cyclic formals each having at least one carbon-carbon bond is used. Typical examples of the compound (b) used as a comonomer include 1,3-dioxolane, diethylene glycol formal, 1,4-butanediol formal, 1,3-dioxane, ethylene oxide, propylene oxide, and epichlorohydrin. In particular, considering stability of polymerization, for example, 1,3-dioxolane, diethylene glycol formal, 1,4-butanediol formal, 1,3-dioxane, and ethylene dioxide are preferred. Further, cyclic esters such as β-propiolactone and vinyl compounds such as styrene can also be used. In addition, as the comonomer, a monofunctional cyclic ether or cyclic formal having a substituent unit, such as butyl glycidyl ether and 2-ethylhexyl glycidyl ether, can also be used. Further, as the comonomer, a compound having two polymerizable cyclic ether or cyclic formal groups, such as diglycidyl ether and diformal of alkylene glycol, for example, butanediol dimethyidene glyceryl ether, and butanediol diglycidyl ether; and a compound having three or more polymerizable cyclic ether or cyclic formal groups, such as glycerin triglycidyl ether, trimethylol propane triglycidyl ether, and pentaerythritol tetraglycidyl ether, can also be used. Accordingly, a polyacetal copolymer having a branched structure or a crosslinked structure is also encompassed in the present invention.

In the present invention, the amount of the compound (b) used as the comonomer selected from cyclic ethers and cyclic formals is preferably 0.1 to 20 mol %, more preferably 0.2 to 10 mol %, as a proportion in the total monomer (the total amount of the main monomer and the comonomer). A too small amount of the comonomer increases the unstable terminal portions of the crude polyacetal copolymer generated by polymerization to deteriorate the stability. A too large amount of the comonomer softens the generated copolymer to cause a disadvantageous decrease of the melting point.

[Polymerization Catalyst (c)]

One of the characteristics of the present invention is the use of a heteropoly acid as a polymerization catalyst (c) in the production of a polyacetal copolymer as described above.

In the present invention, the heteropoly acid used as the polymerization catalyst (c) is a general term for polyoxometalate generated by dehydration and condensation of different oxyacids and has a specific hetero element at the center and includes a mononuclear or binuclear complex ion formed through condensation of a condensed acid group by sharing an oxygen atom. Such a heteronuclear condensed acid can be represented by the following Formula (1):

$$H_m[M^1{}_x M^2{}_y O_z] \cdot nH_2O \quad (1)$$

In Formula (1), $M^1$ represents a central element composed of one or two elements selected from P and Si; $M^2$ represents one or more coordination elements selected from W, Mo, and V; and x represents an integer of 1 or more and 10 or less, y represents an integer of 6 or more and 40 or less, z represents an integer of 10 or more and 100 or less, m represents an integer of 1 or more, and n represents an integer of 0 or more and 50 or less.

Specific examples of the heteropoly acid include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, and silicomolybdotungstovanadic acid. In particular, considering the stability of polymerization and stability of the heteropoly acid itself, the heteropoly acid is preferably at least one of silicomolybdic acid, silicotungstic acid, phosphomolybdic acid, and phosphotungstic acid.

In the present invention, although the amount of the aforementioned heteropoly acid to be used varies depending on its type and can be appropriately changed to control the polymerization reaction, the amount is usually within a range of 0.05 to 100 ppm (hereinafter refers to wt/wt ppm), preferably 0.1 to 50 ppm, based on the total amount of the monomer to be polymerized. In a heteropoly acid having a very strong effect, such as phosphomolybdic acid and phosphotungstic acid, an amount of 0.1 to 10 ppm is sufficient. The fact that copolymerization is possible with such a small amount of a catalyst is effective for keeping undesirable reactions, such as decomposition and depolymerization of the main chain of the polymer, by the catalyst, to a minimum and suppressing the generation of unstable terminal groups, such as formate terminal group (—O—CH=O) and hemiacetal terminal group (—O—CH$_2$—OH) and is also economically advantageous.

In order to homogeneously performing the reaction, the polymerization catalyst is desirably diluted with an inert solvent not disadvantageously affecting the polymerization and is then added to a main monomer and/or a comonomer. Preferred examples of the inert solvent include, but not limited to, esters obtained by condensation of a low molecular weight carboxylic acid having 1 to 10 carbons, such as formic acid, acetic acid, propionic acid, and butyric acid, and a low molecular weight alcohol having 1 to 10 carbons, such as methanol, ethanol, 1-propanol, 2-propanol, 1-butanol, 2-butanol, 2-methyl-1-propanol, 2-methyl-2-propanol, 1-pentanol, 3-methyl-1-butanol, and 1-hexanol; and low molecular weight ketones having 1 to 10 carbons, such as acetone, 2-butanone, 2-pentanone, 3-pentanone, 2-hexanone, 3-hexanone, methyl isobutyl ketone, and methyl t-butyl ketone. Considering, for example, industrial availability, most preferred examples are methyl formate, ethyl formate, methyl acetate, ethyl acetate, butyl acetate, acetone, 2-butanone, and methyl isobutyl ketone. The polymerization catalyst is dissolved in the inert solvent at a concentration of, preferably, 1 to 30 wt/wt %, but is not limited thereto. In addition, it is also preferred to previously mix a predetermined amount of the polymerization catalyst with a part or whole amount of one or more of the above-described main monomer, comonomer, molecular weight modifier, etc. and to add the resulting solution to a polymerization system to perform polymerization.

[Preparation of Copolymer]

In the present invention, the preparation of the crude polyacetal copolymer by polymerization can be performed by the same method and equipment as those for conventionally known copolymerization of trioxanes. That is, all of a batch type, a continuous type, and a semi-continuous type can be used, and a method using a liquid monomer and preparing a solid powder bulk polymer with the progress of polymerization is generally used. As the polymerization apparatus used in the present invention, as the batch type, a typical reaction tank equipped with a stirrer can be used. As the continuous type, a co-kneader, a twin-screw continuous extrusion kneader, a twin-screw paddle continuous kneader, and other continuous polymerization apparatuses for trioxanes, etc. proposed so far can be used. Further, a combination of two or more polymerization apparatuses may be used.

Although the polymerization method is not particularly limited, as proposed above, the required amount of the catalyst can be reduced by previously sufficiently mixing trioxane, a comonomer, and a heteropoly acid as a polymerization catalyst while maintaining the liquid phase state and feeding the resulting reaction raw material mixture solution to a polymerization apparatus to perform copolymerization. As a result, it is advantageous for preparing a polyacetal copolymer with less emission amount of formaldehyde and is a more preferred polymerization method. The polymerization temperature is within a range of 60° C. to 120° C.

In the present invention, in the preparation of a polyacetal copolymer by polymerization of the main monomer (a) and the comonomer (b), a known chain transfer agent, for example, a low molecular weight linear acetal, such as methylal, may be added for adjusting the degree of polymerization.

The polymerization is desirably performed in a state substantially free from impurities having active hydrogen, such as water, methanol, and formic acid, for example, in a state in which the amount of each of these impurities is 10 ppm or less. Accordingly, it is desirable to use trioxane, a cyclic ether and/or cyclic formal prepared to contain these impurities as little as possible, as the main monomer and the comonomer.

[Compound (d) Which is a Carbonate, Hydrogen Carbonate, or Carboxylate of an Alkali Metal Element or an Alkaline Earth Metal Element or a Hydrate Thereof or a Hydroxide of an Alkali Metal Element or an Alkaline Earth Metal Element]

In the present invention, a compound (d) which is a carbonate, hydrogen carbonate, or carboxylate of an alkali metal element or an alkaline earth metal element or a hydrate thereof or a hydroxide of an alkali metal element or an alkaline earth metal element is added to the polyacetal copolymer (crude polyacetal copolymer) prepared by copolymerization as described above and containing a polymerization catalyst and having unstable terminal portions, and the mixture is melt-kneaded to deactivate the polymerization catalyst and reduce the unstable terminal groups possessed by the polyacetal copolymer (crude copolymer) for stabilization. Hereinafter, "carbonate, hydrogen carbonate, or carboxylate of an alkali metal element or an alkaline earth metal element or a hydrate thereof or a hydroxide of an alkali metal element or an alkaline earth metal element" is also referred to component (d). Such stabilization treatment can be more simply and efficiently performed by directly adding the component (d) without subjecting the crude polyacetal copolymer prepared by copolymerization to processes such as washing.

[Carbonate, Hydrogen Carbonate, or Carboxylate of Alkali Metal Element or Alkaline Earth Metal Element or Hydrate Thereof]

When the component (d) is a carbonate, hydrogen carbonate, or carboxylate of an alkali metal element or an alkaline earth metal element or a hydrate thereof, the component (d) is preferably a carbonate, hydrogen carbonate, aliphatic carboxylate, unsaturated aliphatic carboxylate, or aromatic carboxylate of an alkali metal element or an alkaline earth metal element or a hydrate thereof. Specific examples of the component (d) include, but not limited to, lithium carbonate, anhydrous sodium carbonate, sodium carbonate monohydrate, sodium carbonate decahydrate, potassium carbonate, rubidium carbonate, cesium carbonate, magnesium carbonate, calcium carbonate, barium carbonate, lithium hydrogen carbonate, sodium hydrogen carbonate, potassium hydrogen carbonate, cesium hydrogen carbonate, lithium formate monohydrate, sodium formate, potassium formate, rubidium formate, cesium formate, magnesium formate, calcium formate, barium formate, lithium acetate, sodium acetate, sodium acetate trihydrate, potassium acetate, rubidium acetate, cesium acetate, magnesium acetate, calcium acetate monohydrate, magnesium acetate tetrahydrate, barium acetate, sodium laurate, potassium laurate, lithium stearate, sodium stearate, potassium stearate, magnesium stearate, calcium stearate, sodium gluconate, potassium gluconate, lithium lactate, sodium lactate, potassium lactate, lithium oxalate, sodium oxalate, potassium oxalate monohydrate, lithium succinate, monosodium succinate, disodium succinate, disodium succinate hexahydrate, dipotassium succinate, disodium adipate, dipotassium adipate, sodium gluconate, potassium gluconate, lithium lactate, sodium lactate, potassium lactate, disodium malate ½ hydrate, disodium malate trihydrate, dilithium tartrate monohydrate, disodium tartrate dihydrate, potassium hydrogen tartrate, dipotassium tartrate, potassium sodium tartrate tetrahydrate, sodium rubidium tartrate, lithium citrate tetrahydrate, monosodium citrate, disodium citrate, trisodium citrate, trisodium citrate dihydrate, sodium aspartate monohydrate, disodium glutamate monohydrate, sodium acrylate, potassium acrylate, sodium sorbate, potassium sorbate, monosodium fumarate, lithium benzoate, sodium benzoate, potassium benzoate, cesium benzoate, potassium hydrogen phthalate, lithium salicylate monohydrate, sodium salicylate, and potassium salicylate.

Considering, for example, industrial availability, the component (d) is preferably lithium carbonate, anhydrous sodium carbonate, sodium carbonate monohydrate, sodium carbonate decahydrate, potassium carbonate, magnesium carbonate, calcium carbonate, barium carbonate, lithium hydrogen carbonate, sodium hydrogen carbonate, potassium hydrogen carbonate, lithium formate monohydrate, sodium formate, potassium formate, magnesium formate, calcium formate, barium formate, lithium acetate, sodium acetate, sodium acetate trihydrate, potassium acetate, calcium acetate monohydrate, magnesium acetate tetrahydrate, barium acetate, sodium laurate, potassium laurate, lithium stearate, sodium stearate, potassium stearate, magnesium stearate, calcium stearate, monosodium succinate, disodium succinate, disodium succinate hexahydrate, dipotassium succinate, lithium citrate tetrahydrate, monosodium citrate, trisodium citrate, trisodium citrate dihydrate, sodium aspartate monohydrate, disodium glutamate, sodium acrylate, potassium acrylate, sodium sorbate, potassium sorbate, monosodium fumarate, lithium benzoate, sodium benzoate, potassium benzoate, potassium hydrogen phthalate, lithium salicylate monohydrate, sodium salicylate, and potassium salicylate.

Further, considering the hue of the polyacetal copolymer after deactivation of the polymerization catalyst (c), the component (d) is more preferably, for example, sodium formate, sodium acetate, anhydrous sodium carbonate, sodium carbonate monohydrate, sodium carbonate decahydrate, sodium hydrogen carbonate, disodium succinate hexahydrate, sodium laurate, and sodium stearate.

When the component (d) is a carbonate, hydrogen carbonate, or carboxylate of an alkali metal element or an alkaline earth metal element or a hydrate thereof, the component (d) may be a single compound, may be used as a combination of two or more of compounds, or may be in a state of, for example, a mixture or a double salt thereof. Examples of the double salt include sodium sesquicarbonate composed of sodium carbonate and sodium hydrogen carbonate.

When the component (d) is a carbonate, hydrogen carbonate, or carboxylate of an alkali metal element or an alkaline earth metal element or a hydrate thereof, although the content of the component (d) is not particularly limited, it is preferred to appropriately change the content depending on (i) the amount of the catalyst remaining in the polymer, (ii) the type and the amount of unstable terminal groups generated by various conditions for the polymerization, and (iii) the degree of activity of the component (d) and treatment conditions (e.g., temperature, time, and contact rate). Specifically, the content of the component (d) is preferably very small and is preferably 0.002 to 1.0 milliequivalents, more preferably 0.006 to 0.34 milliequivalents, more preferably 0.009 to 0.17 milliequivalents, and further preferably 0.009 to 0.10 milliequivalents per 1 kg of the crude polyacetal copolymer produced by copolymerization. The b value of the polyacetal copolymer after deactivation of the polymerization catalyst (c) can be reduced to 2.0 or less by adjusting the content of the component (d) to 1.0 milliequivalents or less per 1 kg of the crude polyacetal copolymer. Further, the b value of a polyacetal copolymer pellet after deactivation of the polymerization catalyst (c) can be reduced to 0.4 or less by adjusting the content of the component (d) to 0.34 milliequivalents per 1 kg of the crude polyacetal copolymer.

A too large amount of the component (d) is not preferable because of a risk of deteriorating the hue of the polyacetal copolymer after deactivation of the polymerization catalyst (c), and a too small amount of the component (d) is not also preferable because of a risk of not sufficiently achieving the efficiency of deactivation or the stabilization of the unstable terminal portions.

[Hydroxide of Alkali Metal Element or Alkaline Earth Metal Element]

When the component (d) is a hydroxide of an alkali metal element or an alkaline earth metal element, the component (d) is most preferably, for example, lithium hydroxide, sodium hydroxide, potassium hydroxide, magnesium hydroxide, calcium hydroxide, or barium hydroxide, but is not limited thereto.

In particular, considering the hue of the polyacetal copolymer after deactivation of the polymerization catalyst (c), the component (d) is preferably a hydroxide of an alkali metal and more preferably lithium hydroxide or sodium hydroxide.

When the component (d) is a hydroxide of an alkali metal element or an alkaline earth metal element, the salts (d) represented by formula (2) may be used alone, in combination of two or more thereof, or as a mixture thereof.

When the component (d) is an hydroxide of an alkali metal element or an alkaline earth metal element, although the content of the component (d) is not particularly limited, it is preferred to appropriately change the content depending on (i) the amount of the catalyst remaining in the polymer, (ii) the type and the amount of unstable terminal groups generated by various conditions of the polymerization, and (iii) the degree of activity of the component (d) and treatment conditions (e.g., temperature, time, and contact rate). Specifically, the content of the component (d) is preferably very small and is preferably 0.001 to 0.25 milliequivalents, more preferably 0.002 to 0.10 milliequivalents, and further preferably 0.002 to 0.025 milliequivalents per 1 kg of the crude polyacetal copolymer produced by copolymerization. The lower limit of the content of the component (d) affects the melt index (MI) value, and the MI value can be reduced to about 10 or less by adjusting the content of the component (d) to 0.001 milliequivalents or more per 1 kg of the crude polyacetal copolymer, and the MI value can be reduced to 10 or less by adjusting the content to 0.002 milliequivalents or more. The upper limit of the content of the component (d) affects the hue (b value) of the pellet, and the b value of the polyacetal copolymer after deactivation of the polymerization catalyst (c) can be reduced to 2.0 or less by adjusting the content of the component (d) to 0.25 milliequivalents or less per 1 kg of the crude polyacetal copolymer. In addition, the b value of the polyacetal copolymer after deactivation of the polymerization catalyst (c) can be reduced to 1.0 or less by adjusting the content of the component (d) to 0.10 milliequivalents or less per 1 kg of the crude polyacetal copolymer. In addition, the b value of the polyacetal copolymer after deactivation of the polymerization catalyst (c) can be reduced to 0.0 or less by adjusting the content of the component (d) to 0.10 milliequivalents or less per 1 kg of the crude polyacetal copolymer.

A too large amount of the component (d) is not preferable because of a risk of deteriorating the hue of the polyacetal copolymer after deactivation of the polymerization catalyst (c), and a too small amount of the component (d) is not also preferable because of a risk of not sufficiently achieving the efficiency of deactivation or the stabilization of unstable terminal portions.

[Deactivation of Catalyst]

In the present invention, in order to enhance the hue of the polyacetal copolymer after deactivation of the polymerization catalyst (c), the content of the component (d) is preferably very small, but it is extremely difficult to uniformly disperse the very small amount of the component (d) throughout the copolymer. Accordingly, the addition of the component (d) is preferably performed by any of the following (i) to (iii):

(i) A solution of the component (d) is directly added to the crude polyacetal copolymer prepared by copolymerization;
(ii) A solution of the component (d) is impregnated in a powder of a polyacetal copolymer and is uniformly dispersed therein, and then, the powder after the dispersion is added to the crude polyacetal copolymer; and
(iii) The component (d) in a solid state is directly uniformly dispersed in a powder of a polyacetal copolymer, and then the powder after the dispersion is added to the crude polyacetal copolymer.

When the component (d) is impregnated in a powder of a polyacetal copolymer, mixing can be performed with a standard mixer of, for example, horizontal cylinder type, V type, ribbon type, puddle type, or high-speed flow type. The mixture may be directly subjected to melting treatment or may be subjected to melting treatment after distillation of the solvent by, for example, heating or reduction of pressure. In addition, a solution of a deactivation and stabilization agent may be supplied from a feeding port of the extruder and/or the middle by injection or the like. On this occasion, the solution of a deactivation and stabilization agent may be dividedly supplied at multiple stages.

The very small amount of the component (d) can be uniformly dispersed throughout the copolymer by adding the component (d) as described above. As a result, the b value of the polyacetal copolymer after deactivation of the polymerization catalyst (c) measured with a color-difference meter can be reduced to 2.0 or less. The b value in the present specification is a value displayed on a color-difference meter SE-2000 (manufactured by Nippon Denshoku Industries Co., Ltd. NIPPON DENSHOKU INDUSTRIES CO., LTD.) when a predetermined amount of a pellet put in a cell (round cell) for measurement, which is placed on a sample table and is covered, is measured.

In the present invention, in deactivation of the catalyst after polymerization, a less amount of the unreacted monomers is preferred. The amount of the unreacted monomers (the total amount of the unreacted main monomer and comonomer) is preferably 10 wt % or less, further preferably 5 wt % or less, and particularly preferably 3 wt % or less of the crude copolymer. Consequently, the crude polyacetal copolymer generated by polymerization can be treated without washing, which is a particularly advantageous aspect of the present invention. The amount of unreacted monomers can be generally reduced by increasing the rate of polymerization to a certain level or more, which is readily achieved in the present invention by appropriately controlling the amount of the catalyst and the polymerization time (the retention time in a continuous type) and can be achieved within a relatively short period of time due to the use of a heteropoly acid catalyst having high activity even at a small amount. In addition, a part of the remaining monomers after copolymerization may be removed by evaporation or vaporization to a predetermined amount of the residual monomers. Further, the unreacted trioxane and comonomer collected as gases may be liquefied during or after the copolymerization. In such a case, the unreacted trioxane and comonomer can be directly re-used as a part of raw material monomers, leading to a more economical process.

In addition, according to need, conventionally known catalyst-deactivating agent or decomposition agent for unstable terminals can be used together with the component (d).

In the present invention, the component (d) functioning as a deactivation and stabilization agent may be added before or after the melting of the crude polyacetal copolymer or both before and after the melting. The component (d) may be dividedly added at multiple stages.

When the component (d) is added as a deactivation and stabilization agent, the crude copolymer is preferably fine particulates. Accordingly, the reactor preferably has a function of sufficiently pulverizing a block of polymerization product. However, the reaction product after polymerization may be separately pulverized with a pulverizer. The particle size of the crude copolymer in deactivation is 10 mm or less, preferably 4 mm or less, and further preferably 2 mm or less in at least 90 wt % or more of the crude copolymer.

[Aliphatic Polycarboxylic Acid (e) Having Four or More Carbons and Two or More Carboxyl Groups]

In the present invention, an aliphatic polycarboxylic acid (e) having four or more carbons and two or more carboxyl groups and a hindered phenolic antioxidant (f) are added to the polyacetal copolymer prepared through the above-described process.

It has been proposed to considerably improve the processing stability of a polyacetal resin and significantly suppress the generation of formaldehyde by adding a carboxyl group-containing compound having a pKa of 3.6 or more. However, the carboxyl group-containing compound is not particularly limited as long as the pKa is 3.6 or more, and, for example, it has not been known that a specific carboxyl group-containing compound contributes to improvement in the appearance of the molded article and to prevention of discoloration of the polyacetal resin composition present in a molding machine.

The present invention is characterized in that among carboxyl group-containing compounds, an aliphatic polycarboxylic acid having at least two carboxyl groups and having at least four carbons is used.

A monocarboxylic acid has a low boiling point, compared to a carboxylic acid having two or more carboxyl groups, and has poor compatibility with polyacetal. Even if the polyacetal resin composition contains a carboxylic acid, when the carboxylic acid is a monocarboxylic acid, the generation amount of formaldehyde cannot be suppressed to a level as low as that in the present invention, due to the difference in the boiling point and the compatibility with polyacetal, even if the amount of monocarboxylic acid is increased such that the amount of carboxyl groups contained in the monocarboxylic acid is increased to within the range of a preferred amount of carboxyl groups contained in dicarboxylic acid. In addition, the appearance of the molded article is poor compared to the present invention. Accordingly, monocarboxylic acids are not preferred as the carboxylic acid.

Even if the carboxylic acid contained in the polyacetal resin composition has two or more carboxyl groups, when the carboxylic acid is ethanedioic acid (oxalic acid, aliphatic saturated dicarboxylic acid having two carbons), propanedioic acid (malonic acid, aliphatic saturated dicarboxylic acid having three carbons), or the like, unfortunately, the carboxylic acid itself has low thermal stability and very high acid strength and thereby may accelerate the decomposition of the polyacetal.

The aliphatic polycarboxylic acid (e) may be any polycarboxylic acid having at least two carboxylic groups and at least four carbons.

In the present specification, the term "aliphatic" refers to noncyclic or cyclic nonaromatic properties and is a concept that can include linear, branched, and alicyclic (nonaromatic ring) compounds.

If the polycarboxylic acid compound is an aliphatic compound, the generation amount of formaldehyde can be further suppressed to a lower level, compared to the case of an aromatic compound, and the appearance of the molded article and the prevention of discoloration of the polyacetal resin composition due to the retention inside the molding machine are also excellent.

The polycarboxylic acid may be any carboxylic acid having at least two carboxylic groups and may be dicarboxylic acid, tricarboxylic acid, or tetracarboxylic acid. The carboxylic acid may be a monoester of tricarboxylic acid, a monoester of tetracarboxylic acid, or a diester of tetracarboxylic acid.

The carboxylic acid may be a saturated carboxylic acid or may be an unsaturated carboxylic acid.

Specific examples of the aliphatic saturated dicarboxylic acid having four or more carbons include, butanedioic acid (succinic acid, aliphatic saturated dicarboxylic acid having four carbons), pentanedioic acid (glutaric acid, aliphatic saturated dicarboxylic acid having five carbons), hexanedioic acid (adipic acid, aliphatic saturated dicarboxylic acid having six carbons), heptanedioic acid (pimelic acid, aliphatic saturated dicarboxylic acid having seven carbons), octanedioic acid (suberic acid, cork acid, aliphatic saturated dicarboxylic acid having eight carbons), nonanedioic acid (azelaic acid, aliphatic saturated dicarboxylic acid having nine carbons), decanedioic acid (sebacic acid, aliphatic saturated dicarboxylic acid having ten carbons), undecanedioic acid (aliphatic saturated dicarboxylic acid having 11 carbons), and dodecanedioic acid (aliphatic saturated dicarboxylic acid having 12 carbons).

Specific examples of aliphatic unsaturated dicarboxylic acid having four or more carbons include butenedioic acid (fumaric acid, aliphatic unsaturated dicarboxylic acid having four carbons), pentenedioic acid (glutaconic acid, aliphatic unsaturated dicarboxylic acid having five carbons), hexenedioic acid (dihydromuconic acid, aliphatic unsaturated dicarboxylic acid having six carbons), octenedioic acid (aliphatic unsaturated dicarboxylic acid having eight carbons), decenedioic acid (aliphatic unsaturated dicarboxylic acid having ten carbons), undecenedioic acid (aliphatic unsaturated dicarboxylic acid having 11 carbons), and dodecenedionic acid (aliphatic unsaturated dicarboxylic acid having 12 carbons).

Specific examples of the aliphatic tricarboxylic acid having four or more carbons include 2-hydroxypropane-1,2,3-tricarboxylic acid (citric acid). Specific examples of the aliphatic tetracarboxylic acid having four or more carbons include ethylene tetracarboxylic acid.

As the aliphatic polycarboxylic acid having at least four carbons and at least two carboxyl groups, those having the carboxylic groups as pendants introduced to the polymer chains are also included. Specific examples thereof include an ethylene acrylic acid copolymer resin and an ethylene methacrylic acid copolymer resin.

In the present invention, the amount of the component (e) is 0.002 parts by weight or more and 0.1 parts by weight or less based on 100 parts by weight of the polyacetal resin composition. The amount of the component (e) is preferably 0.005 parts by weight or more and 0.02 parts by weight or less. A small amount of the component (e), unfortunately, cannot impart sufficient heat resistance stability to the polyacetal resin composition and may cause factors such as generation of formaldehyde due to decomposition of the resin during processing. In contrast, if the amount of the component (e) is too large, unfortunately, the oil resistance (grease resistance) of the resulting resin composition is insufficient, and corrosion of the resin molded article may progress by contact of the resin molded article with machine oil, grease, etc.

[Hindered Phenolic Antioxidant (f)]

The present invention can use any hindered phenolic antioxidant (f), and examples thereof, but not limited thereto, include monocyclic hindered phenolic compounds (e.g., 2,6-di-t-butyl-p-cresol), polycyclic hindered phenolic compounds linked to hydrocarbon groups or sulfur atom-containing groups (e.g., 2,2'-methylenebis(4-methyl-6-t-butylphenol), 4,4'-methylenebis(2,6-di-t-butylphenol), 1,1,3-tris(2-methyl-4-hydroxy-5-t-butylphenyl)butane, 4,4'-butylidenebis(3-methyl-6-t-butylphenol), 1,3,5-trimethyl-2,4,6-tris(3,5-di-t-butyl-4-hydroxybenzyl)bezene, 4,4'-thiobis(3-methyl-6-t-butylphenol)), hindered phenolic compounds having ester groups or amide groups (e.g., n-octadecyl-3-(4'-hydroxy-3', 5'-di-t-butylphenyl)propionate, n-octadecyl-2-(4'-hydroxy-3', 5'-di-t-butylphenyl)propionate, 1,6-hexanediol-bis[3-(3,5-di-t-butyl-4-hydroxyphenyl) propionate], triethylene glycol-bis[3-(3-t-butyl-5-methyl-4-hydroxyphenyl)propionate], pentaerythritol tetrakis[3-(3,5-di-t-butyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxaspiro[5.5]undecane, 2-t-butyl-6-(3'-t-butyl-5'-methyl-2'-hydroxybenzyl)-4-methylphenyl acrylate, 2-[1-(2-hydroxy-3,5-di-t-pentylphenyl)ethyl]-4,6-di-t-pentylphenyl acrylate, di-n-octadecyl-3,5-di-t-butyl-4-hydroxybenzyl phosphonate, N,N'-hexamethylenebis(3,5-di-t-butyl-4-hydroxy-dihydrocinnamamide, N,N'-ethylenebis[3-(3,5-di-t-butyl-4-hydroxyphenyl)propionamide], N,N'-tetramethylenebis[3-(3, 5-di-t-butyl-4-hydroxyphenyl)propionamide], N,N'-hexamethylenebis[3-(3,5-di-t-butyl-4-hydroxyphenyl) propionamide], N,N'-ethylenebis[3-(3-t-butyl-5-methyl-4-hydroxyphenyl)propionamide], N,N'-hexamethylenebis[3-(3-t-butyl-5-methyl-4-hydroxyphenyl)propionamide], N,N'-bis[3-(3,5-di-t-butyl-4-hydroxyphenyl)propionyl]hydrazine, N,N'-bis[3-(3-t-butyl-5-methyl-4-hydroxyphenyl)propionyl]hydrazine, 1,3,5-tris(3,5-di-t-butyl-4-hydroxybenzyl) isocyanurate, and 1,3,5-tris(4-t-butyl-3-hydroxy-2,6-dimethylbenzyl)isocyanurate.

In the present invention, one or more selected from these antioxidants can be used.

The content of the hindered phenolic antioxidant (f) in the present invention is 0.01 parts by weight or more and 0.5 parts by weight or less, preferably 0.02 parts by weight or more and 0.4 parts by weight or less based on 100 parts by weight of the polyacetal copolymer. If the amount of the hindered phenolic antioxidant (f) is small, disadvantageously, the antioxidant properties are insufficient, and the stability of the polyacetal resin composition against short-term oxidative degradation at high temperature such as during a molding process or oxidative degradation by long-term use at ordinary temperature is apt to be insufficient. In contrast, if the amount of the hindered phenolic antioxidant (f) is excessive, it is not only uneconomical, but also may cause a factor of impairing the mechanical properties of the resulting resin composition.

[Other Components]

The polyacetal resin composition may further contain other components as needed. One or more known stabilizers against the polyacetal resin composition can be added within a range that does not impair the purpose and the effect of the present invention. In addition, within a range that does not impair the purpose and the effect of the present invention, one or more general additives against thermoplastic resins, for example, a colorant, such as a dye and a pigment, a lubricant, a release agent, an antistatic agent, a surfactant, an organic polymer material, and an inorganic or organic fibrous, powdery, or plate-like filler, can be added as needed.

[Melt-kneading Treatment]

Although any melt-kneading apparatus can be used, an apparatus having a function of kneading a molten copolymer and preferably having a vent function can be used. Examples of the apparatus include single-screw or multi-screw continuous kneading extruder and co-kneader each having at least one vent hole. In this melt-kneading treatment, the present invention completely deactivates the polymerization catalyst and decreases the unstable terminal portions for stabilization. The melt-kneading treatment is preferably performed within a temperature range from the melting point of the copolymer to 260° C. A temperature of higher than 260° C. disadvantageously causes decomposition degradation of the polymer.

Furthermore, on this stage, as needed, any of various substances known as stabilizers for polyacetal resins may be added without any problem. Further, for example, an inorganic filler such as glass fibers, a crystallization accelerator (nucleating agent), a release agent, and an antioxidant may be added.

As described above, a component (d) is added as a deactivation and stabilization agent to a crude copolymer, the mixture is melt-kneaded, the formaldehyde gas generated by decomposition, unreacted monomers, oligomers, and the deactivation and stabilization agent, etc. are usually removed from the vent part of an extruder under reduced pressure, followed by molding into, for example, a pellet as a product for resin finishing. The pellet is dried as needed. The drying is performed, for example, at 135° C. for about 4 hours.

EXAMPLES

The present invention will now be described in detail by Examples but is not limited thereto.

Examples 1 to 34, Comparative Examples 1 to 84

[Copolymerization of Trioxane as Main Monomer (a) and Cyclic Ether and/or Cyclic Formal as Comonomer (b)]

A continuous twin-screw polymerization apparatus was used as the apparatus for polymerization. The polymerization apparatus is equipped on the outside with a jacket through which a heating or cooling medium passes and is equipped on the inside with two rotary shafts having numerous buddles for stirring and driving in the longitudinal direction. Hot water of 80° C. was allowed to pass through the jacket of the twin-screw polymerization apparatus; a mixed liquid containing 96.2 wt % of trioxane as a main monomer (a) and 3.8 wt % of 1,3-dioxolane as a comonomer (b) and containing 1000 ppm of methylal as a chain transfer agent was continuously supplied to one end of the polymerization apparatus, while rotating the two rotary shafts at a constant speed; and phosphotungstic acid as a polymerization catalyst (c) was continuously added to the mixed liquid in an amount of 3 ppm relative to the total amount of the monomers. Copolymerization was thus performed. In Table 1, the amount of the polymerization catalyst is the weight ratio (unit: ppm) to the total amount of all the monomers.

[Deactivation of Polymerization Catalyst (c)]

The reaction product (crude polyacetal copolymer) by copolymerization was discharged from a discharge port provided on the other end of the polymerization apparatus, and salts (d) shown in Tables 1 to 3 were added for deactivation of the catalyst. The salt (d) was added as follows. When the "Addition method" column in Tables 1 to 3 is written as "Solid", the component (d) was uniformly dispersed in a polyacetal copolymer powder in a solid state, and the powder after the dispersing process was then added to the reaction product. When the "Addition method" column in Tables 1 to 3 is written as "Aqueous solution", a 10 wt % aqueous solution containing the component (d) was prepared so as to have a predetermined number of moles, 10 mL of the aqueous solution was added to a powder of the polyacetal copolymer, and the resulting mixture was added to the reaction product.

[Melt-kneading of Component (e) and Component (f)]

Subsequently, the polycarboxylic acid (e) shown in Tables 1 to 3 was added in an amount shown in Tables 1 to 3, and 0.3 wt % of triethylene glycol-bis[3-(3-t-butyl-5-methyl-4-hydroxyphenyl)propionate] as an antioxidant was added thereto. The mixture was melt-kneaded and extruded with a twin-screw extruder equipped with a vent at 220° C. and a vacuum of 5 mmHg of the vent part to prepare each pellet of the polyacetal copolymers according to examples and comparative examples.

TABLE 1

| | | (d)Deactivating agent | | | (e)Multivalent carboxylic acid | | | HCHO generation | |
|---|---|---|---|---|---|---|---|---|---|
| | | Deactivating agent | Amount [ppm] | Addition method | Type | | Amount [ppm] | amount [μg/g] | Appearance 1~3 |
| Example | 1 | Sodium hydroxide | 0.5 | 10 wt % aqueous solution | Adipic acid(Number of carbons: 6) | e-1 | 200 | 12 | 1 |
| Example | 2 | Sodium hydroxide | 0.5 | 10 wt % aqueous solution | Decanedioic acid(Number of carbons: 10) | e-2 | 200 | 13 | 1 |
| Example | 3 | Sodium hydroxide | 0.5 | 10 wt % aqueous solution | Dodecanedioic acid(Number of carbons: 12) | e-3 | 200 | 15 | 1 |
| Example | 4 | Sodium hydroxide | 0.5 | 10 wt % aqueous solution | Ethylene methacrylic acid copolymer | e-4 | 500 | 18 | 1 |
| Example | 5 | Sodium hydroxide | 0.5 | 10 wt % aqueous solution | Ethylene acrylic acid copolymer | e-5 | 500 | 15 | 1 |
| Example | 6 | Anhydrous sodium carbonate | 10 | Solid | Adipic acid(Number of carbons: 6) | e-1 | 200 | 18 | 1 |
| Example | 7 | Anhydrous sodium carbonate | 10 | Solid | Decanedioic acid(Number of carbons: 10) | e-2 | 200 | 15 | 1 |
| Example | 8 | Anhydrous sodium carbonate | 10 | Solid | Dodecanedioic acid(Number of carbons: 12) | e-3 | 200 | 19 | 1 |
| Example | 9 | Anhydrous sodium carbonate | 10 | Solid | Ethylene methacrylic acid copolymer | e-4 | 500 | 17 | 1 |
| Example | 10 | Anhydrous sodium carbonate | 10 | Solid | Ethylene acrylic acid copolymer | e-5 | 500 | 14 | 1 |
| Example | 11 | Sodium formate | 10 | Solid | Adipic acid(Number of carbons: 6) | e-1 | 200 | 14 | 1 |
| Example | 12 | Sodium formate | 10 | Solid | Decanedioic acid(Number of carbons: 10) | e-2 | 200 | 13 | 1 |
| Example | 13 | Sodium formate | 10 | Solid | Dodecanedioic acid(Number of carbons: 12) | e-3 | 200 | 15 | 1 |
| Example | 14 | Sodium formate | 10 | Solid | Ethylene methacrylic acid copolymer | e-4 | 500 | 13 | 1 |
| Example | 15 | Sodium formate | 10 | Solid | Ethylene acrylic acid copolymer | e-5 | 500 | 15 | 1 |
| Example | 16 | Sodium hydrogen carbonate | 10 | Solid | Adipic acid(Number of carbons: 6) | e-1 | 200 | 13 | 1 |
| Example | 17 | Sodium hydrogen carbonate | 10 | Solid | Decanedioic acid(Number of carbons: 10) | e-2 | 200 | 12 | 1 |
| Example | 18 | Sodium hydrogen carbonate | 10 | Solid | Dodecanedioic acid(Number of carbons: 12) | e-3 | 200 | 11 | 1 |
| Example | 19 | Sodium hydrogen carbonate | 10 | Solid | Ethylene methacrylic acid copolymer | e-4 | 500 | 13 | 1 |
| Example | 20 | Sodium hydrogen carbonate | 10 | Solid | Ethylene acrylic acid copolymer | e-5 | 500 | 15 | 1 |
| Example | 21 | Sodium acetate | 10 | Solid | Adipic acid(Number of carbons: 6) | e-1 | 200 | 18 | 1 |
| Example | 22 | Sodium acetate | 10 | Solid | Decanedioic acid(Number of carbons: 10) | e-2 | 200 | 13 | 1 |
| Example | 23 | Sodium acetate | 10 | Solid | Dodecanedioic acid(Number of carbons: 12) | e-3 | 200 | 15 | 1 |
| Example | 24 | Sodium acetate | 10 | Solid | Ethylene methacrylic acid copolymer | e-4 | 500 | 15 | 1 |
| Example | 25 | Sodium acetate | 10 | Solid | Ethylene acrylic acid copolymer | e-5 | 500 | 17 | 1 |
| Example | 26 | Sodium stearate | 20 | Solid | Adipic acid(Number of carbons: 6) | e-1 | 200 | 11 | 1 |
| Example | 27 | Sodium stearate | 20 | Solid | Decanedioic acid(Number of carbons: 10) | e-2 | 200 | 15 | 1 |
| Example | 28 | Sodium stearate | 20 | Solid | Dodecanedioic acid(Number of carbons: 12) | e-3 | 200 | 13 | 1 |
| Example | 29 | Sodium stearate | 20 | Solid | Ethylene methacrylic acid copolymer | e-4 | 500 | 18 | 1 |
| Example | 30 | Sodium stearate | 20 | Solid | Ethylene acrylic acid copolymer | e-5 | 500 | 15 | 1 |
| Example | 31 | Calcium stearate | 20 | Solid | Dodecanedioic acid(Number of carbons: 12) | e-3 | 200 | 16 | 1 |

TABLE 1-continued

| | | (d)Deactivating agent | | | (e)Multivalent carboxylic acid | | | HCHO generation amount [μg/g] | Appearance 1~3 |
|---|---|---|---|---|---|---|---|---|---|
| | | Deactivating agent | Amount [ppm] | Addition method | Type | | Amount [ppm] | | |
| Example | 32 | Magnesium stearate | 20 | Solid | Ethylene methacrylic acid copolymer | e-4 | 500 | 18 | 1 |
| Example | 33 | Calcium hydroxide | 3 | Solid | Dodecanedioic acid(Number of carbons: 12) | e-3 | 200 | 17 | 1 |
| Example | 34 | Magnesium hydroxide | 3 | Solid | Ethylene methacrylic acid copolymer | e-4 | 500 | 15 | 1 |

TABLE 2

| | | (d)Deactivating agent | | | (e)Multivalent carboxylic acid | | | HCHO generation amount [μg/g] | Appearance 1~3 |
|---|---|---|---|---|---|---|---|---|---|
| | | Deactivating agent | Amount [ppm] | Addition method | Type | | Amount [ppm] | | |
| Comparative Example | 1 | Sodium hydroxide | 0.5 | 10 wt % aqueous solution | | | | 35 | 1 |
| Comparative Example | 2 | Anhydrous sodium carbonate | 10 | Solid | | | | 45 | 1 |
| Comparative Example | 3 | Sodium formate | 10 | Solid | | | | 39 | 1 |
| Comparative Example | 4 | Sodium hydrogen carbonate | 10 | Solid | | | | 41 | 1 |
| Comparative Example | 5 | Sodium acetate | 10 | Solid | | | | 42 | 1 |
| Comparative Example | 6 | Sodium stearate | 20 | Solid | | | | 45 | 1 |
| Comparative Example | 7 | Melamine | 700 | Solid | | | | 55 | 1 |
| Comparative Example | 8 | Melamine | 700 | Solid | Adipic acid(Number of carbons: 6) | e-1 | 200 | 52 | 1 |
| Comparative Example | 9 | Melamine | 700 | Solid | Decanedioic acid(Number of carbons: 10) | e-2 | 200 | 48 | 1 |
| Comparative Example | 10 | Melamine | 700 | Solid | Dodecanedioic acid(Number of carbons: 12) | e-3 | 200 | 60 | 1 |
| Comparative Example | 11 | Melamine | 700 | Solid | Ethylene methacrylic acid copolymer | e-4 | 500 | 49 | 1 |
| Comparative Example | 12 | Melamine | 700 | Solid | Ethylene acrylic acid copolymer | e-5 | 500 | 62 | 1 |
| Comparative Example | 13 | Melamine resin | 700 | Solid | | | | 83 | 1 |
| Comparative Example | 14 | Melamine resin | 700 | Solid | Adipic acid(Number of carbons: 6) | e-1 | 200 | 65 | 1 |
| Comparative Example | 15 | Melamine resin | 700 | Solid | Decanedioic acid(Number of carbons: 10) | e-2 | 200 | 72 | 1 |
| Comparative Example | 16 | Melamine resin | 700 | Solid | Dodecanedioic acid(Number of carbons: 12) | e-3 | 200 | 80 | 1 |
| Comparative Example | 17 | Melamine resin | 700 | Solid | Ethylene methacrylic acid copolymer | e-4 | 500 | 66 | 1 |
| Comparative Example | 18 | Melamine resin | 700 | Solid | Ethylene acrylic acid copolymer | e-5 | 500 | 70 | 1 |
| Comparative Example | 19 | CTU guanamine | 700 | Solid | | | | 45 | 1 |
| Comparative Example | 20 | CTU guanamine | 700 | Solid | Adipic acid(Number of carbons: 6) | e-1 | 200 | 44 | 1 |
| Comparative Example | 21 | CTU guanamine | 700 | Solid | Decanedioic acid(Number of carbons: 10) | e-2 | 200 | 50 | 1 |
| Comparative Example | 22 | CTU guanamine | 700 | Solid | Dodecanedioic acid(Number of carbons: 12) | e-3 | 200 | 52 | 1 |
| Comparative Example | 23 | CTU guanamine | 700 | Solid | Ethylene methacrylic acid copolymer | e-4 | 500 | 55 | 1 |
| Comparative Example | 24 | CTU guanamine | 700 | Solid | Ethylene acrylic acid copolymer | e-5 | 500 | 72 | 1 |
| Comparative Example | 25 | CMTU guanamine | 700 | Solid | | | | 50 | 1 |
| Comparative Example | 26 | CMTU guanamine | 700 | Solid | Adipic acid(Number of carbons: 6) | e-1 | 200 | 52 | 1 |
| Comparative Example | 27 | CMTU guanamine | 700 | Solid | Decanedioic acid(Number of carbons: 10) | e-2 | 200 | 60 | 1 |
| Comparative Example | 28 | CMTU guanamine | 700 | Solid | Dodecanedioic acid(Number of carbons: 12) | e-3 | 200 | 55 | 1 |
| Comparative Example | 29 | CMTU guanamine | 700 | Solid | Ethylene methacrylic acid copolymer | e-4 | 500 | 55 | 1 |
| Comparative Example | 30 | CMTU guanamine | 700 | Solid | Ethylene acrylic acid copolymer | e-5 | 500 | 52 | 1 |
| Comparative Example | 31 | Benzoguanamine | 700 | Solid | | | | 60 | 1 |
| Comparative Example | 32 | Benzoguanamine | 700 | Solid | Adipic acid(Number of carbons: 6) | e-1 | 200 | 64 | 1 |
| Comparative Example | 33 | Benzoguanamine | 700 | Solid | Decanedioic acid(Number of carbons: 10) | e-2 | 200 | 66 | 1 |
| Comparative Example | 34 | Benzoguanamine | 700 | Solid | Dodecanedioic acid(Number of carbons: 12) | e-3 | 200 | 70 | 1 |
| Comparative Example | 35 | Benzoguanamine | 700 | Solid | Ethylene methacrylic acid copolymer | e-4 | 500 | 50 | 1 |
| Comparative Example | 36 | Benzoguanamine | 700 | Solid | Ethylene acrylic acid copolymer | e-5 | 500 | 52 | 1 |
| Comparative Example | 37 | Polyamide6 | 700 | Solid | | | | 120 | 1 |
| Comparative Example | 38 | Polyamide6 | 700 | Solid | Adipic acid(Number of carbons: 6) | e-1 | 200 | 100 | 1 |
| Comparative Example | 39 | Polyamide6 | 700 | Solid | Decanedioic acid(Number of carbons: 10) | e-2 | 200 | 132 | 1 |
| Comparative Example | 40 | Polyamide6 | 700 | Solid | Dodecanedioic acid(Number of carbons: 12) | e-3 | 200 | 122 | 1 |
| Comparative Example | 41 | Polyamide6 | 700 | Solid | Ethylene methacrylic acid copolymer | e-4 | 500 | 98 | 1 |
| Comparative Example | 42 | Polyamide6 | 700 | Solid | Ethylene acrylic acid copolymer | e-5 | 500 | 108 | 1 |
| Comparative Example | 43 | Polyamide12 | 700 | Solid | | | | 132 | 1 |
| Comparative Example | 44 | Polyamide12 | 700 | Solid | Adipic acid(Number of carbons: 6) | e-1 | 200 | 112 | 1 |
| Comparative Example | 45 | Polyamide12 | 700 | Solid | Decanedioic acid(Number of carbons: 10) | e-2 | 200 | 110 | 1 |
| Comparative Example | 46 | Polyamide12 | 700 | Solid | Dodecanedioic acid(Number of carbons: 12) | e-3 | 200 | 128 | 1 |
| Comparative Example | 47 | Polyamide12 | 700 | Solid | Ethylene methacrylic acid copolymer | e-4 | 500 | 125 | 1 |
| Comparative Example | 48 | Polyamide12 | 700 | Solid | Ethylene acrylic acid copolymer | e-5 | 500 | 123 | 1 |

TABLE 3

| | | (d)Deactivating agent | | | (e)Multivalent carboxylic acid | | | HCHO generation amount [µg/g] | Appearance 1~3 |
|---|---|---|---|---|---|---|---|---|---|
| | | Deactivating agent | Amount [ppm] | Addition method | Type | | Amount [ppm] | | |
| Comparative Example | 49 | Sodium hydroxide | 0.5 | 10 wt % aqueous solution | Caproic acid(Number of carbons: 6) | e-6 | 200 | 28 | 3 |
| Comparative Example | 50 | Sodium hydroxide | 0.5 | 10 wt % aqueous solution | Capric acid(Number of carbons: 10) | e-7 | 200 | 25 | 3 |
| Comparative Example | 51 | Sodium hydroxide | 0.5 | 10 wt % aqueous solution | Stearic acid(Number of carbons: 18) | e-8 | 200 | 30 | 3 |
| Comparative Example | 52 | Sodium hydroxide | 0.5 | 10 wt % aqueous solution | Oxalic acid(Number of carbons: 2) | e-9 | 200 | 88 | 2 |
| Comparative Example | 53 | Sodium hydroxide | 0.5 | 10 wt % aqueous solution | Malonic acid(Number of carbons: 3) | e-10 | 500 | 95 | 2 |
| Comparative Example | 54 | Sodium hydroxide | 0.5 | 10 wt % aqueous solution | Phthalic acid(Aromatic carboxylic acid) | e-11 | 500 | 88 | 2 |
| Comparative Example | 55 | Anhydrous sodium carbonate | 10 | Solid | Caproic acid(Number of carbons: 6) | e-6 | 200 | 20 | 3 |
| Comparative Example | 56 | Anhydrous sodium carbonate | 10 | Solid | Capric acid(Number of carbons: 10) | e-7 | 200 | 23 | 3 |
| Comparative Example | 57 | Anhydrous sodium carbonate | 10 | Solid | Stearic acid(Number of carbons: 18) | e-8 | 200 | 28 | 3 |
| Comparative Example | 58 | Anhydrous sodium carbonate | 10 | Solid | Oxalic acid(Number of carbons: 2) | e-9 | 200 | 65 | 3 |
| Comparative Example | 59 | Anhydrous sodium carbonate | 10 | Solid | Malonic acid(Number of carbons: 3) | e-10 | 500 | 82 | 3 |
| Comparative Example | 60 | Anhydrous sodium carbonate | 10 | Solid | Phthalic acid(Aromatic carboxylic acid) | e-11 | 500 | 92 | 3 |
| Comparative Example | 61 | Sodium formate | 10 | Solid | Caproic acid(Number of carbons: 6) | e-6 | 200 | 25 | 3 |
| Comparative Example | 62 | Sodium formate | 10 | Solid | Capric acid(Number of carbons: 10) | e-7 | 200 | 20 | 3 |
| Comparative Example | 63 | Sodium formate | 10 | Solid | Stearic acid(Number of carbons: 18) | e-8 | 200 | 18 | 3 |
| Comparative Example | 64 | Sodium formate | 10 | Solid | Oxalic acid(Number of carbons: 2) | e-9 | 200 | 80 | 2 |
| Comparative Example | 65 | Sodium formate | 10 | Solid | Malonic acid(Number of carbons: 3) | e-10 | 500 | 99 | 2 |
| Comparative Example | 66 | Sodium formate | 10 | Solid | Phthalic acid(Aromatic carboxylic acid) | e-11 | 500 | 73 | 2 |
| Comparative Example | 67 | Sodium hydrogen carbonate | 10 | Solid | Caproic acid(Number of carbons: 6) | e-6 | 200 | 20 | 3 |
| Comparative Example | 68 | Sodium hydrogen carbonate | 10 | Solid | Capric acid(Number of carbons: 10) | e-7 | 200 | 22 | 3 |
| Comparative Example | 69 | Sodium hydrogen carbonate | 10 | Solid | Stearic acid(Number of carbons: 18) | e-8 | 200 | 24 | 3 |
| Comparative Example | 70 | Sodium hydrogen carbonate | 10 | Solid | Oxalic acid(Number of carbons: 2) | e-9 | 200 | 86 | 2 |
| Comparative Example | 71 | Sodium hydrogen carbonate | 10 | Solid | Malonic acid(Number of carbons: 3) | e-10 | 500 | 56 | 2 |
| Comparative Example | 72 | Sodium hydrogen carbonate | 10 | Solid | Phthalic acid(Aromatic carboxylic acid) | e-11 | 500 | 67 | 2 |
| Comparative Example | 73 | Sodium acetate | 10 | Solid | Caproic acid(Number of carbons: 6) | e-6 | 200 | 25 | 3 |
| Comparative Example | 74 | Sodium acetate | 10 | Solid | Capric acid(Number of carbons: 10) | e-7 | 200 | 31 | 3 |
| Comparative Example | 75 | Sodium acetate | 10 | Solid | Stearic acid(Number of carbons: 18) | e-8 | 200 | 28 | 3 |
| Comparative Example | 76 | Sodium acetate | 10 | Solid | Oxalic acid(Number of carbons: 2) | e-9 | 200 | 65 | 2 |
| Comparative Example | 77 | Sodium acetate | 10 | Solid | Malonic acid(Number of carbons: 3) | e-10 | 500 | 68 | 2 |
| Comparative Example | 78 | Sodium acetate | 10 | Solid | Phthalic acid(Aromatic carboxylic acid) | e-11 | 500 | 88 | 3 |
| Comparative Example | 79 | Sodium stearate | 20 | Solid | Caproic acid(Number of carbons: 6) | e-6 | 200 | 27 | 3 |
| Comparative Example | 80 | Sodium stearate | 20 | Solid | Capric acid(Number of carbons: 10) | e-7 | 200 | 25 | 3 |
| Comparative Example | 81 | Sodium stearate | 20 | Solid | Stearic acid(Number of carbons: 18) | e-8 | 200 | 30 | 3 |
| Comparative Example | 82 | Sodium stearate | 20 | Solid | Oxalic acid(Number of carbons: 2) | e-9 | 200 | 80 | 2 |
| Comparative Example | 83 | Sodium stearate | 20 | Solid | Malonic acid(Number of carbons: 3) | e-10 | 500 | 98 | 3 |
| Comparative Example | 84 | Sodium stearate | 20 | Solid | Phthalic acid(Aromatic carboxylic acid) | e-11 | 500 | 67 | 2 |

In Tables 1 to 3, each component is as follows.
Deactivating agent (d)
CTU guanamine (3,9-bis[2-(3,5-diamino-2,4,6-triazaphenyl)ethyl]-2,4,8,10-tetraoxaspiro[5,5] undecane)
CMTU guanamine (3,9-bis[1-(3,5-diamino-2,4,6-triazaphenyl)methyl]-2,4,8,10-tetraoxaspiro[5,5] undecane)
Benzoguanamine (2,4-diamino-6-phenyl-1,3,5-triazine)
Polycarboxylic acid (e)
Ethylene methacrylic acid copolymer (product name: Nucrel Nucrel® N1525, manufactured by Du Pont-Mitsui Polychemicals Co., Ltd. DU PONT-MITSUI POLYCHEMICALS CO.,LTD.)
Ethylene acrylic acid copolymer (product name: Primacor PRIMACOR™ 3460, manufactured by The Dow Chemical Company)

[Evaluation]
In order to evaluate the pellet-type polyacetal resin compositions according to Examples and Comparative Examples, the generation amount of formaldehyde and the molded product appearance were evaluated.
[Amount of Formaldehyde Generated from Melt Product]
Five grams of a pellet was precisely weighed and was retained in a metal container at 200° C. for 5 minutes, and the atmosphere in the container was absorbed in the distilled water. The amount of formaldehyde in the aqueous solution was quantified in accordance with JIS K0102, 29. (the paragraph of formaldehyde), and the amount (ppm) of formaldehyde gas generated from the pellet was calculated. The results are shown in Tables 1 to 3.

[Molded Product Appearance]

Evaluation of surface appearance: a plate having a 3-mm thickness and a 50-mm square with 1.5-mm diameter center one-point pin gate was injection molded with an injection molding machine "J75SS2A" (φ35) manufactured by The Japan Steel Works, Ltd. under the following conditions. The surface appearance of the resulting molded product was evaluated for two items: (1) the size (mm) of the flow mark near the gate and (2) visual evaluation of surface roughness. In the item (1), a smaller flow mark is better. Three-grade evaluation from 1 to 3 was performed. Grade 1 denotes good, grade 2 denotes moderate, and grade 3 denotes poor. The results are shown in Tables 1 to 3.

(Molding Conditions)
Cylinder temperature: 200° C.-200° C.-180° C.-150° C.
Mold temperature: 90° C.
Holding pressure: 750 kg/cm²
(Injection conditions)
Injection time: 5 seconds
Measuring (primary-secondary-holding pressure): 25-20-8 mm
Rate (primary-secondary): 25-2.5 mm/sec

[Results]

A polyacetal resin composition prepared using an appropriate material as the deactivating agent (d) for the polymerization catalyst (c) at an appropriate proportion and using an appropriate material as the polycarboxylic acid (e) to be mixed with a polyacetal copolymer at an appropriate proportion can achieve both the suppression of the generation amount of formaldehyde from the molded article to a low level and the provision of better appearance of the molded article (Examples 1 to 34). Accordingly, it can be said that the polyacetal resin compositions of Examples are extremely versatile.

In contrast, in the case of a polyacetal copolymer not containing the aliphatic polycarboxylic acid (e), the generation amount of formaldehyde cannot be sufficiently suppressed compared to Examples (Comparative Examples 1 to 6).

In addition, if the deactivating agent (d) is not a carbonate, hydrogen carbonate, or carboxylate of an alkali metal element or an alkaline earth metal element or a hydroxide of an alkali metal element or an alkaline earth metal element, the generation amount of formaldehyde cannot be sufficiently suppressed compared to Examples (Comparative Examples 7 to 48).

Regarding the component (e), even if a polyacetal resin composition contains a carboxylic acid, when the carboxylic acid is a monocarboxylic acid, not only that the generation amount of formaldehyde cannot be sufficiently suppressed compared to Examples but also that the appearance of the molded article is inferior to that in Examples (Comparative Examples 49 to 51, 55 to 57, 61 to 63, 67 to 69, 73 to 75, and 79 to 81).

Regarding the component (e), even if a polyacetal resin composition contains a polycarboxylic acid having two or more carboxyl groups, when the number of carbons of the carboxylic acid is less than four, the generation amount of formaldehyde cannot be suppressed, and the appearance of the molded product was also poor (Comparative Examples 52, 53, 58, 59, 64, 65, 70, 71, 76, 77, 82, and 83).

Even if a polyacetal resin composition contains a dicarboxylic acid, when the dicarboxylic acid is an aromatic compound, the generation amount of formaldehyde cannot be suppressed to a low level compared to Examples, and the appearance of the molded article is also poor (Comparative Examples 54, 60, 66, 72, 78, and 84).

The invention claimed is:

1. A method for producing a polyacetal resin composition, comprising:
    adding a compound (d) which is a carbonate, hydrogen carbonate, or carboxylate of an alkali metal element or an alkaline earth metal element or a hydrate thereof or a hydroxide of an alkali metal element or an alkaline earth metal element to a reaction product prepared by copolymerization of trioxane as a main monomer (a) and a cyclic ether and/or cyclic formal having at least one carbon-carbon bond as a comonomer (b) using a heteropoly acid represented by Formula (1) as a polymerization catalyst (c);
    melt-kneading the mixture to deactivate the polymerization catalyst (c) and prepare a polyacetal copolymer; and
    adding 0.002 parts by weight or more and 0.1 parts by weight or less of an aliphatic polycarboxylic acid (e) having four or more carbons and two or more carboxyl groups and 0.01 parts by weight or more and 0.5 parts by weight or less of a hindered phenolic antioxidant (f) to 100 parts by weight of the polyacetal copolymer, $$H_m[M^1{}_x \cdot M^2{}_y O_Z] \cdot nH_2O \qquad (1)$$

where $M^1$ represents at least one central element selected from the group consisting of P and Si;
$M^2$ represents one or more coordination elements selected from the group consisting of W, Mo, and V; and
x represents an integer of 1 or more and 10 or less, y represents an integer of 6 or more and 40 or less, z represents an integer of 10 or more and 100 or less, m represents an integer of 1 or more, and n represents an integer of 0 or more and 50 or less.

2. The method for producing a polyacetal resin composition according to claim 1, wherein the aliphatic polycarboxylic acid is one or more selected from the group consisting of adipic acid, decanedioic acid, and dodecanedioic acid.

3. The method for producing a polyacetal resin composition according to claim 1, whereinthe aliphatic polycarboxylic acid is an ethylene acrylic acid copolymer resin or an ethylene methacrylic acid copolymer resin.

* * * * *